(12) United States Patent
Heo

(10) Patent No.: US 11,999,406 B2
(45) Date of Patent: Jun. 4, 2024

(54) STEERING COLUMN FOR VEHICLE

(71) Applicant: HL MANDO CORPORATION, Pyeongtaek (KR)

(72) Inventor: Yong Jun Heo, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/641,807

(22) PCT Filed: Sep. 4, 2020

(86) PCT No.: PCT/KR2020/011898
§ 371 (c)(1),
(2) Date: Mar. 9, 2022

(87) PCT Pub. No.: WO2021/049821
PCT Pub. Date: Mar. 18, 2021

(65) Prior Publication Data
US 2024/0043059 A1    Feb. 8, 2024

(30) Foreign Application Priority Data

Sep. 10, 2019 (KR) .................. 10-2019-0111844

(51) Int. Cl.
*B62D 1/185*   (2006.01)
*B62D 1/181*   (2006.01)
(Continued)

(52) U.S. Cl.
CPC ............. *B62D 1/185* (2013.01); *B62D 1/181* (2013.01); *B62D 1/184* (2013.01); *B62D 1/195* (2013.01)

(58) Field of Classification Search
CPC ........ B62D 1/185; B62D 1/181; B62D 1/184; B62D 1/195
See application file for complete search history.

(56) References Cited

U.S. PATENT DOCUMENTS

| 7,735,868 B2 * | 6/2010 | Ridgway ............... B62D 1/184 |
| | | 280/775 |
| 2017/0043802 A1 * | 2/2017 | Hong .................... B62D 1/189 |

(Continued)

FOREIGN PATENT DOCUMENTS

| CN | 105782402 A | 7/2016 |
| CN | 107401583 A | 11/2017 |

(Continued)

OTHER PUBLICATIONS

Office Action issued in Chinese Patent Application No. 202080063840.6 dated Nov. 28, 2023.

(Continued)

*Primary Examiner* — Drew J Brown
(74) *Attorney, Agent, or Firm* — Harvest IP Law, LLP

(57) ABSTRACT

The present embodiments provide a steering column for a vehicle, comprising: an upper column having a distance housing on one side of the outer circumferential surface; a telescope fixing member having a plurality of locking grooves formed to be axially apart from one another, and coupled to one side surface of the distance housing; a lower column coupled to the outer circumference of the upper column and having a slit formed at one end in the axial direction, wherein a pair of protruding ends are provided on both sides of the slit, and wherein each adjust bolt is coupled to the protruding end by penetrating therethrough, and a mounting groove is provided at one protruding end; and a telescopic moving member having a locking protrusion formed at a lower end thereof, and which is embedded in the mounting groove.

13 Claims, 14 Drawing Sheets

(51) Int. Cl.
*B62D 1/184* (2006.01)
*B62D 1/19* (2006.01)

(56) References Cited

U.S. PATENT DOCUMENTS

| | | |
|---|---|---|
| 2017/0057537 A1 | 3/2017 | Handy |
| 2017/0361862 A1* | 12/2017 | Charvet ................. B62D 1/192 |
| 2018/0057036 A1* | 3/2018 | Kim ....................... B62D 1/184 |
| 2018/0105196 A1 | 4/2018 | Bodtker |
| 2019/0202488 A1 | 7/2019 | Lee |

FOREIGN PATENT DOCUMENTS

| | | |
|---|---|---|
| CN | 107571908 A | 1/2018 |
| CN | 107667051 A | 2/2018 |
| CN | 109835409 A | 6/2019 |
| DE | 102017103753 A1 | 8/2018 |
| DE | 102017213895 A1 | 2/2019 |
| JP | 2007062441 A | 3/2007 |
| JP | 2008007096 A | 1/2008 |
| JP | 2011140261 A | 7/2011 |
| KR | 20180022289 A | 3/2018 |
| KR | 20180070820 A | 6/2018 |
| KR | 102003364 B1 | 7/2019 |
| WO | 2018064161 A1 | 4/2018 |
| WO | 2019091850 A1 | 5/2019 |

OTHER PUBLICATIONS

Office Action issued in Germany Patent Application No. 112020004248.0 dated Jan. 26, 2024.
Notice of Allowance issued in Chinese Patent Application No. 202080063840.6 dated Apr. 15, 2024.

* cited by examiner

STEERING COLUMN FOR VEHICLE

CROSS REFERENCE TO RELATED APPLICATIONS

This application is a National Stage of International Application No. PCT/KR2020/011898 filed on Sep. 4, 2020, claiming priority to Korean Patent Application No. 10-2019-0111844 filed on Sep. 10, 2019, the disclosures of which is incorporated herein by reference in its entirety.

TECHNICAL FIELD

The present embodiments relate to a vehicle steering column. More specifically, the present embodiments relate to a vehicle steering column that allows for smooth collapsing without disturbance between a collapse-sliding component and a fixed component when the vehicle collides, easier adjustment of collapsing load of the steering column according to the collision characteristics per vehicle type and thus better collision performance, and a reduction in the number of components and assembly processes and cost savings.

BACKGROUND ART

In general, the steering column of a vehicle comes with telescoping and tilting features by which the driver may adjust the protrusion and tilt angle of the steering wheel to fit his height or body shape to enable smooth steering.

Such vehicle steering column requires a collision energy absorbing component, such as a capsule, coupled to the mounting bracket to absorb collision energy when the vehicle collides and a separate structure and several components to mount the collision energy absorbing component, e.g., a tearing plate or bending plate. As these components are separately manufactured and assembled, the number of components and processes increases.

Further, the method for absorbing impact by rupture of the tearing groove with a predetermined depth upon secondary load absorption by the tearing plate after primary load absorption suffers from such issues as difficulty in manufacturing the product and a left-right deviation in load that results from interference with surrounding components due to vertical deformation.

DETAILED DESCRIPTION OF THE INVENTION

Technical Problem

The present embodiments have been conceived in light of the foregoing background, aiming to allow a collapse-sliding component of a vehicle and a fixed component to smoothly collapse without disturbance therebetween when the vehicle collides in a vehicle steering column.

The present embodiments also aim to provide for easier adjustment of collapsing load of the steering column according to the collision characteristics per vehicle type and thus better collision performance, and a reduction in the number of components and assembly processes and cost savings.

The objects of the present embodiments are not limited to the foregoing and other objects will be apparent to one of ordinary skill in the art from the following detailed description.

Technical Solution

To achieve the foregoing objectives, according to the present embodiments, there is provided a vehicle steering column, comprising an upper column having a distance housing provided on a side of an outer circumferential surface thereof, a telescope fixing member having a plurality of locking recesses axially spaced apart from each other and coupled to a side surface of the distance housing, a lower column fitted over an outer circumference of the upper column, having a slit cut through an outer circumferential surface and inner circumferential surface of an axial side end thereof, having a pair of protruding ends projecting on two opposite sides of the slit while facing each other and penetrated by an adjust bolt, a mounting recess formed to be open in a side surface of one of the protruding ends, and a telescope moving member having locking protrusions on a lower end to be engaged to the locking recesses and accommodated in the mounting recess.

Advantageous Effects

As described above, the present embodiments may allow for smooth collapsing without disturbance between a collapse-sliding component and a fixed component when the vehicle collides.

The present embodiments also provide for easier adjustment of collapsing load of the steering column according to the collision characteristics per vehicle type and thus better collision performance, and a reduction in the number of components and assembly processes and cost savings.

MODE FOR CARRYING OUT THE INVENTION

Hereinafter, embodiments of the present embodiments are described in detail with reference to the accompanying drawings. The same or substantially the same reference denotations are used to refer to the same or substantially the same elements throughout the specification and the drawings. When determined to make the subject matter of the present invention unclear, the detailed description of the known configurations or functions may be skipped.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When a component is described as "connected," "coupled," or "linked" to another component, the component may be directly connected or linked to the other component, but it should also be appreciated that other components may be "connected," "coupled," or "linked" between the components.

Figure 1:
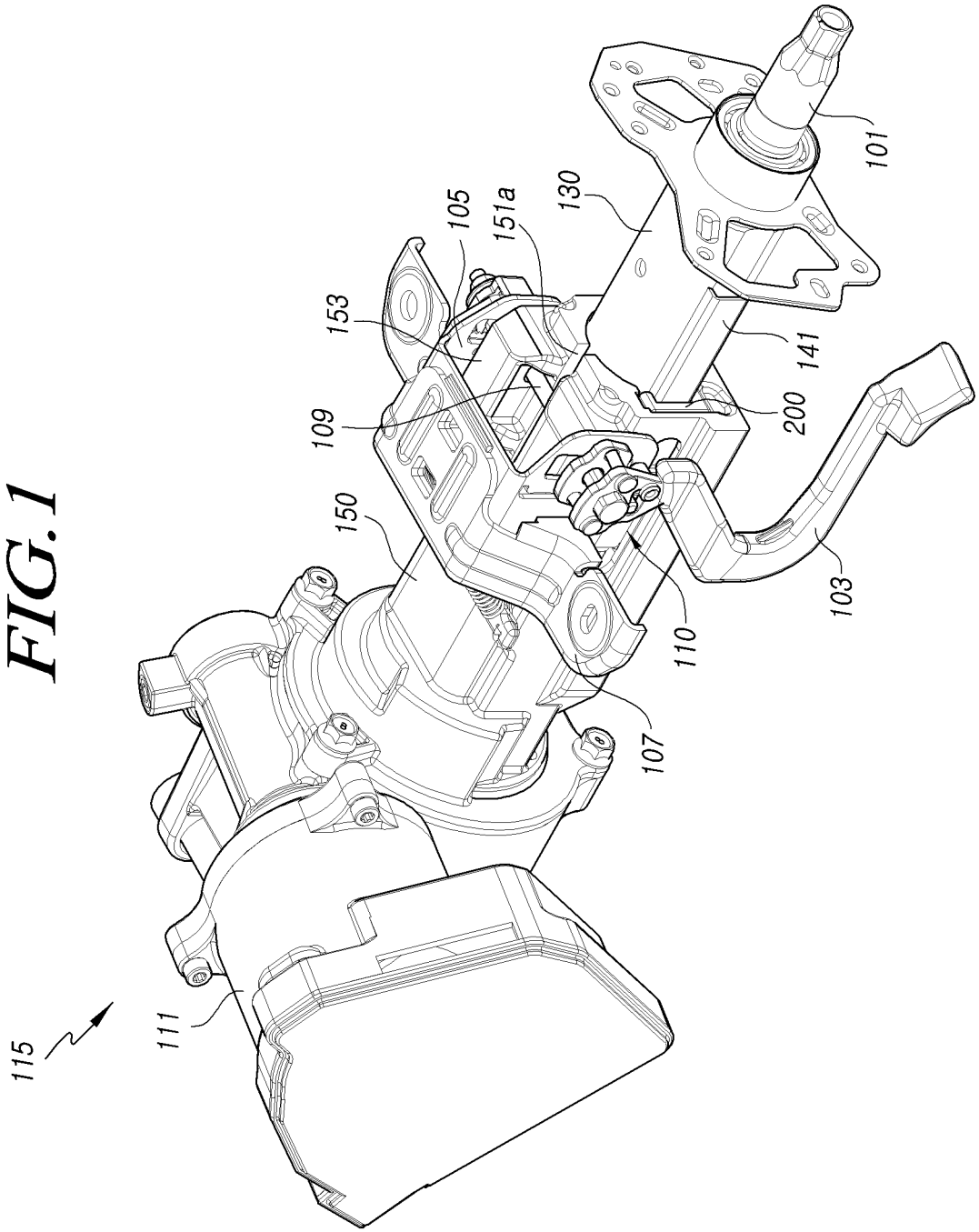
FIG. 1 is a perspective view illustrating a vehicle steering column according to the present embodiments.
Figure 2:
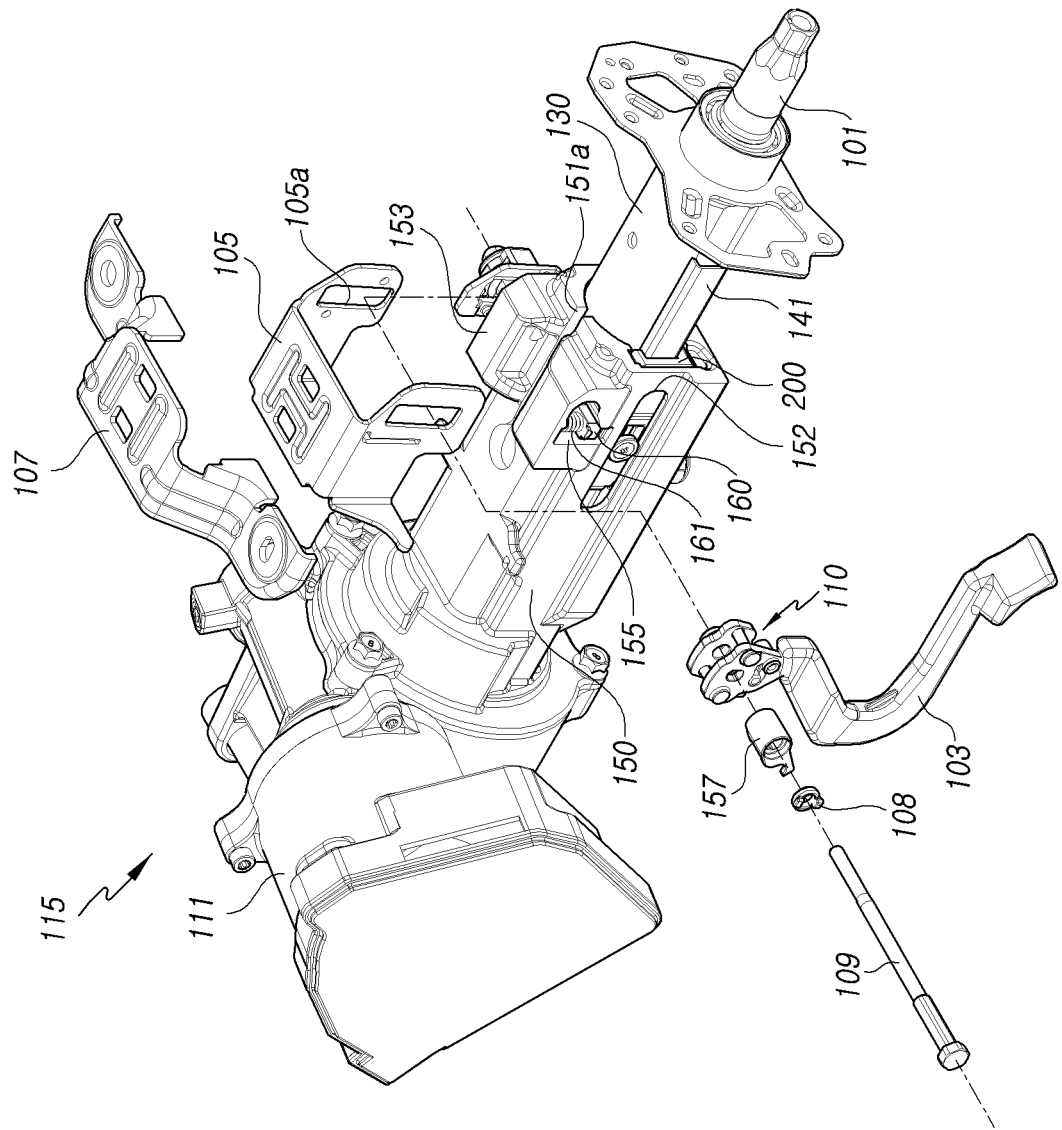
FIG. 2 is an exploded perspective view of FIG. 1.
Figure 3:
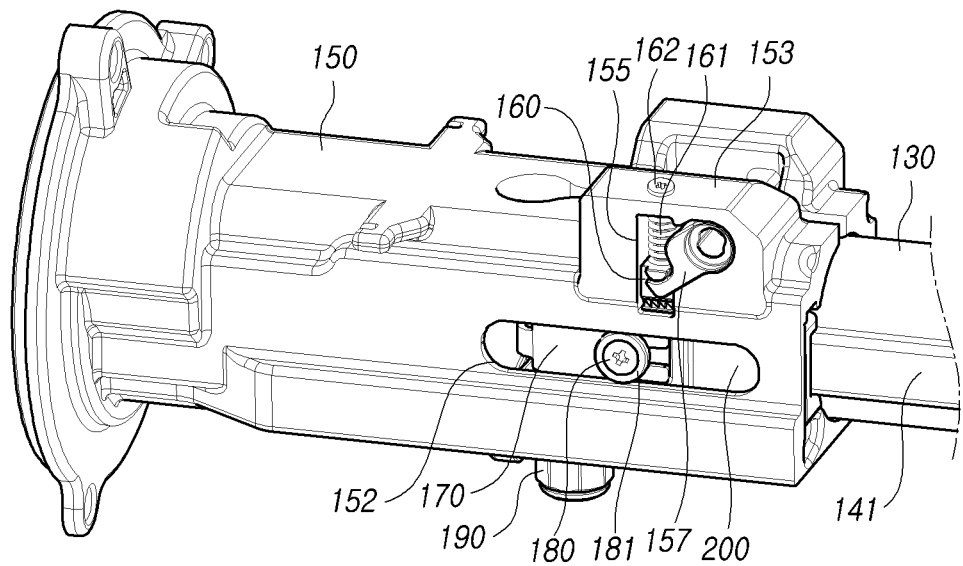
FIG. 3 is a perspective view illustrating a portion of a vehicle steering column according to the present embodiments.
Figure 4:
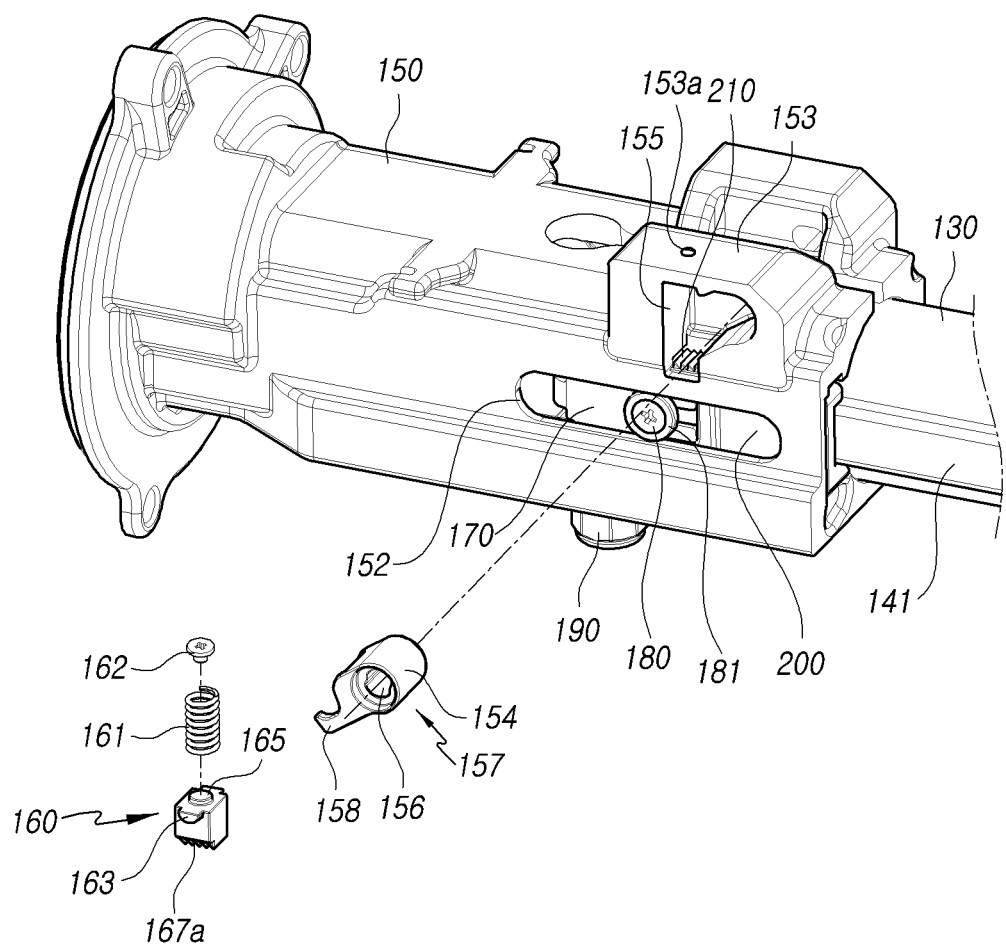
FIG. 4 is an exploded perspective view of FIG. 3.
Figure 6:
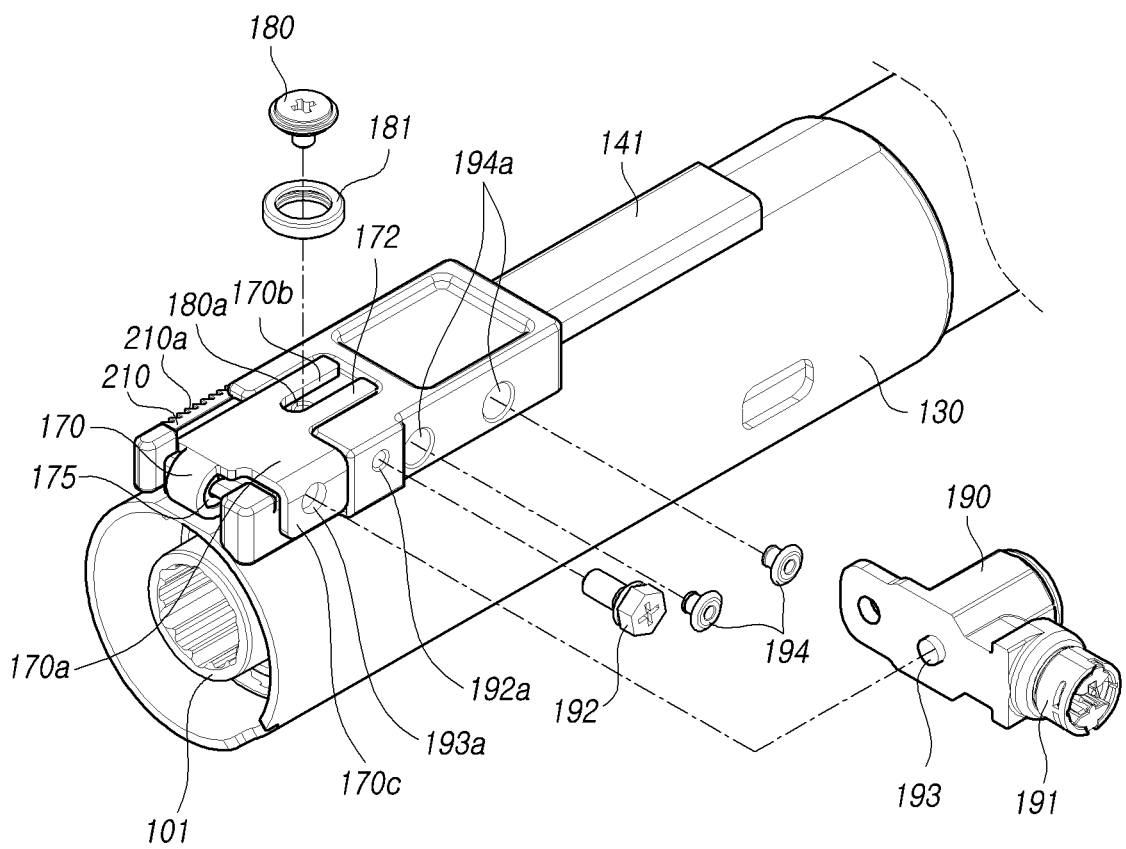
FIG. 6 is an exploded perspective view of FIG. 5.
Figure 7:
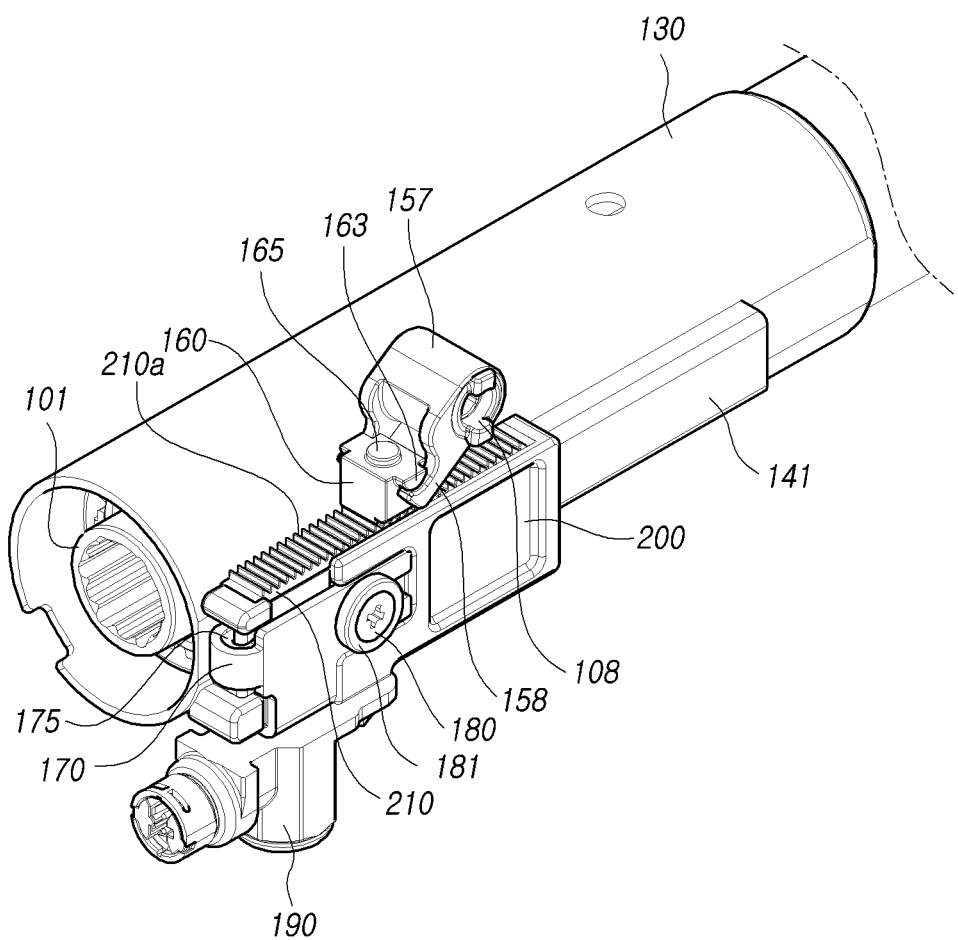
FIG. 7 is a perspective view illustrating a portion of a vehicle steering column according to the present embodiments.
Figure 8:
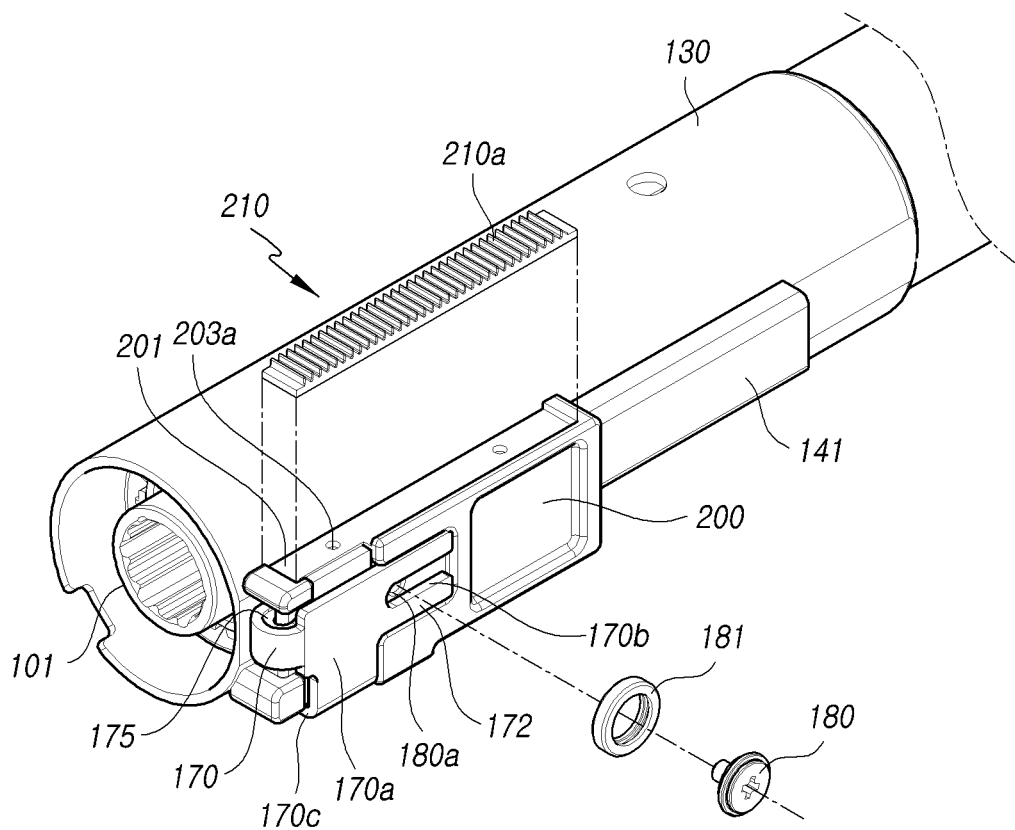
FIG. 8 is an exploded perspective view of FIG. 7.
Figure 9:
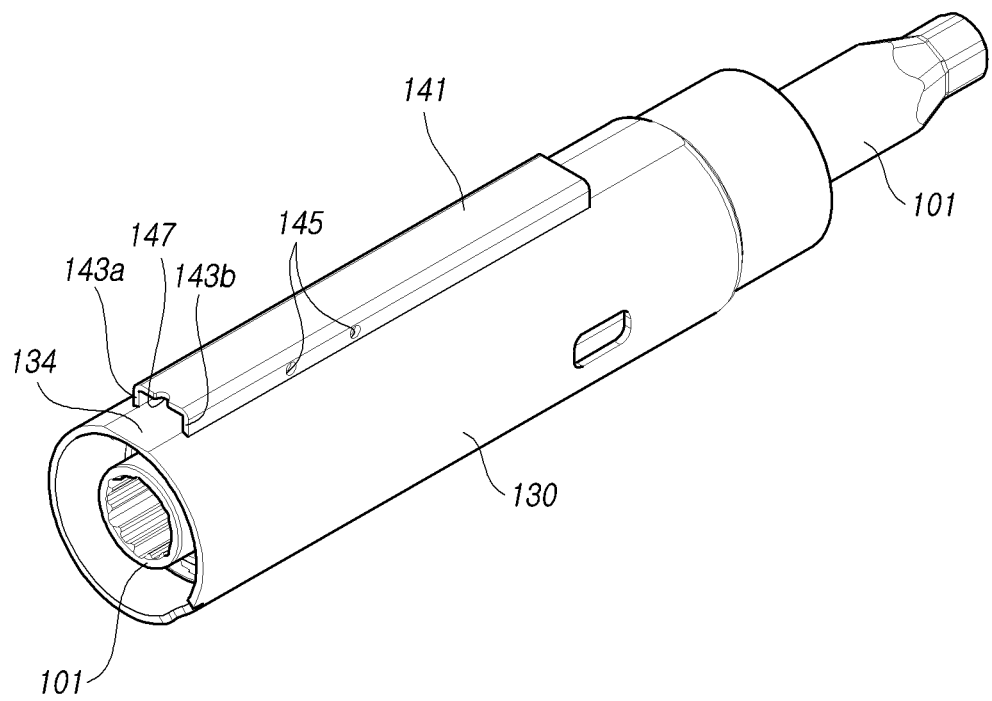
FIG. 9 is a perspective view illustrating a portion of a vehicle steering column according to the present embodiments.
Figure 10:
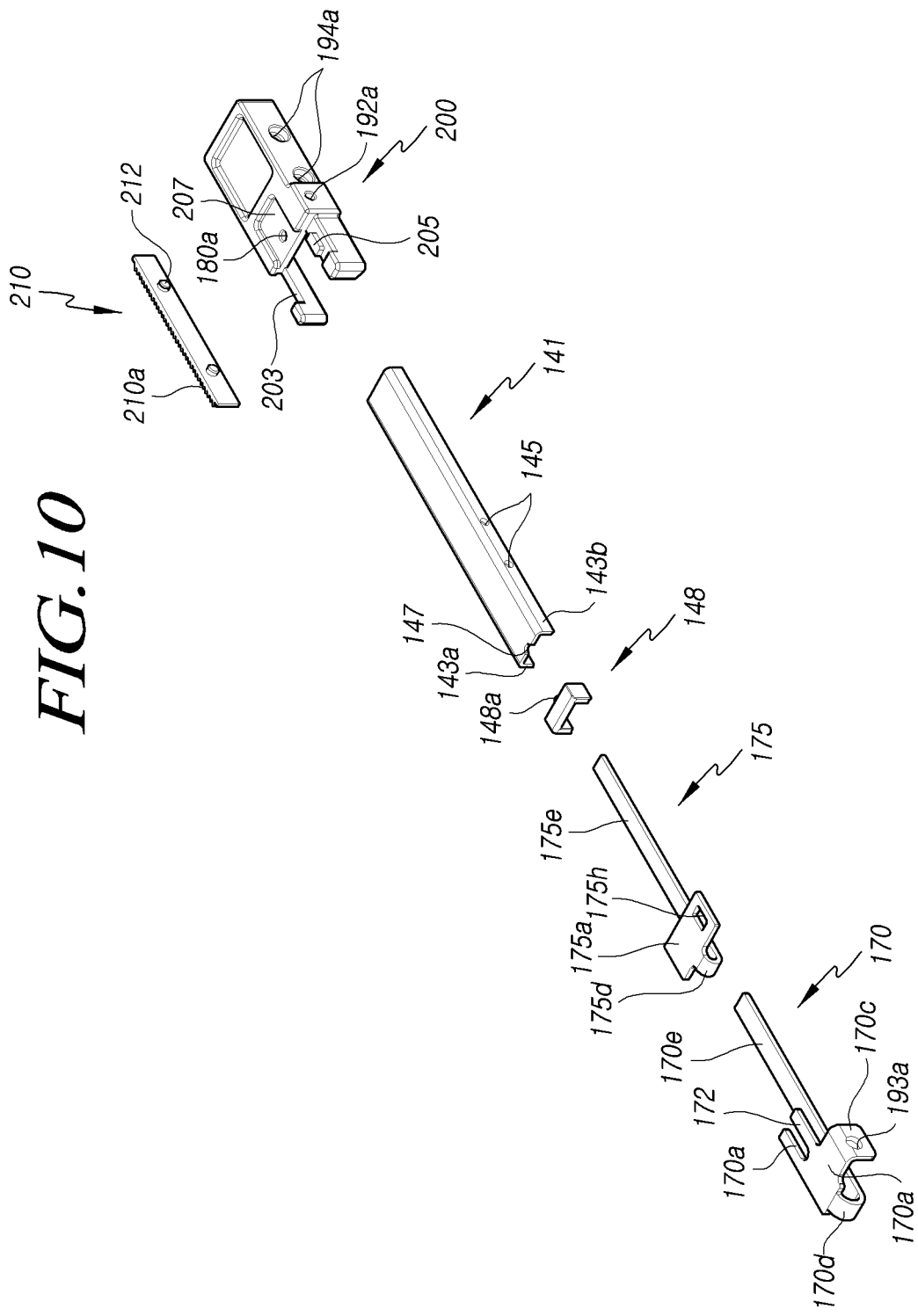
FIGS. 10 and 11 are exploded perspective views illustrating a portion of a vehicle steering column according to the present embodiments.
Figure 11:
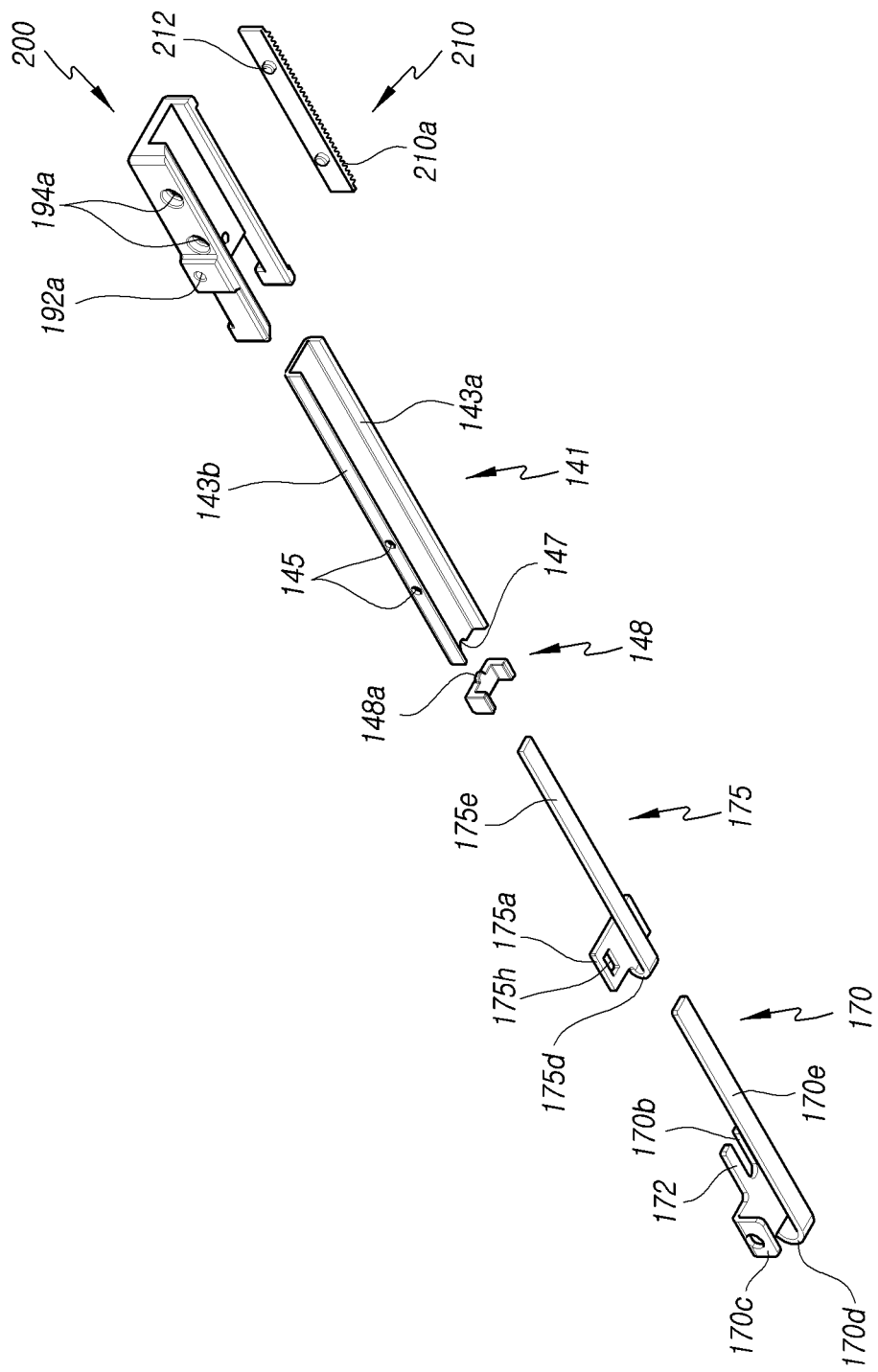
Figure 12:
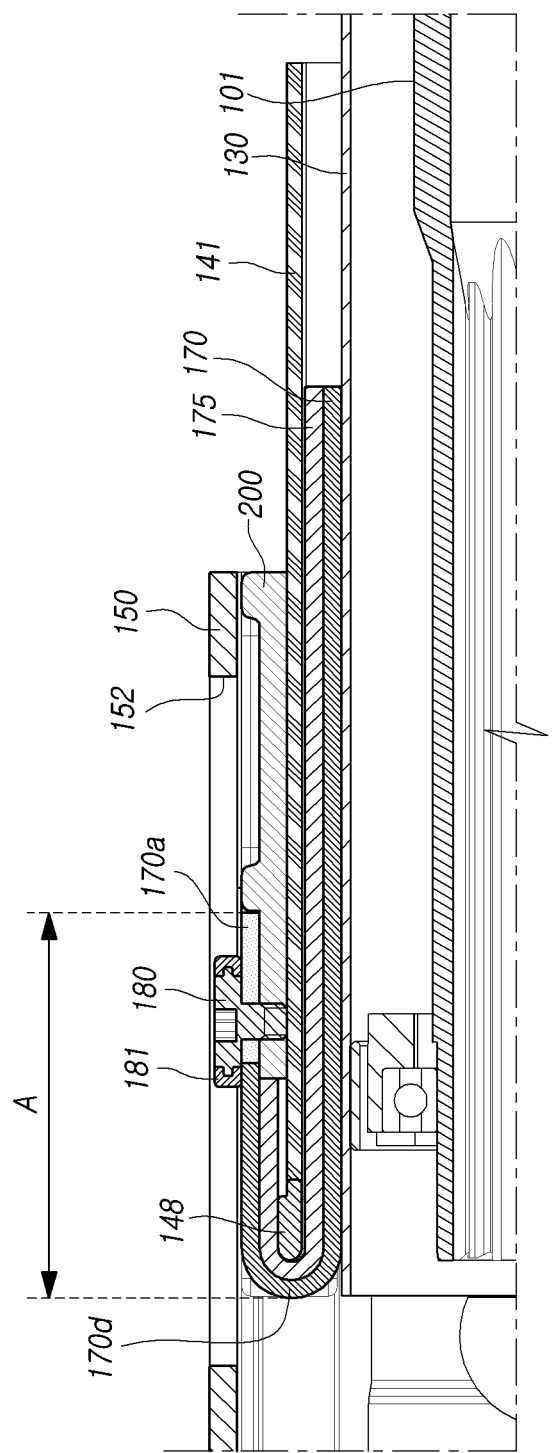
FIGS. 12 to 14 are partial cross-sectional views illustrating a collapse sliding state of a vehicle steering column according to the present embodiments.
Figure 13:
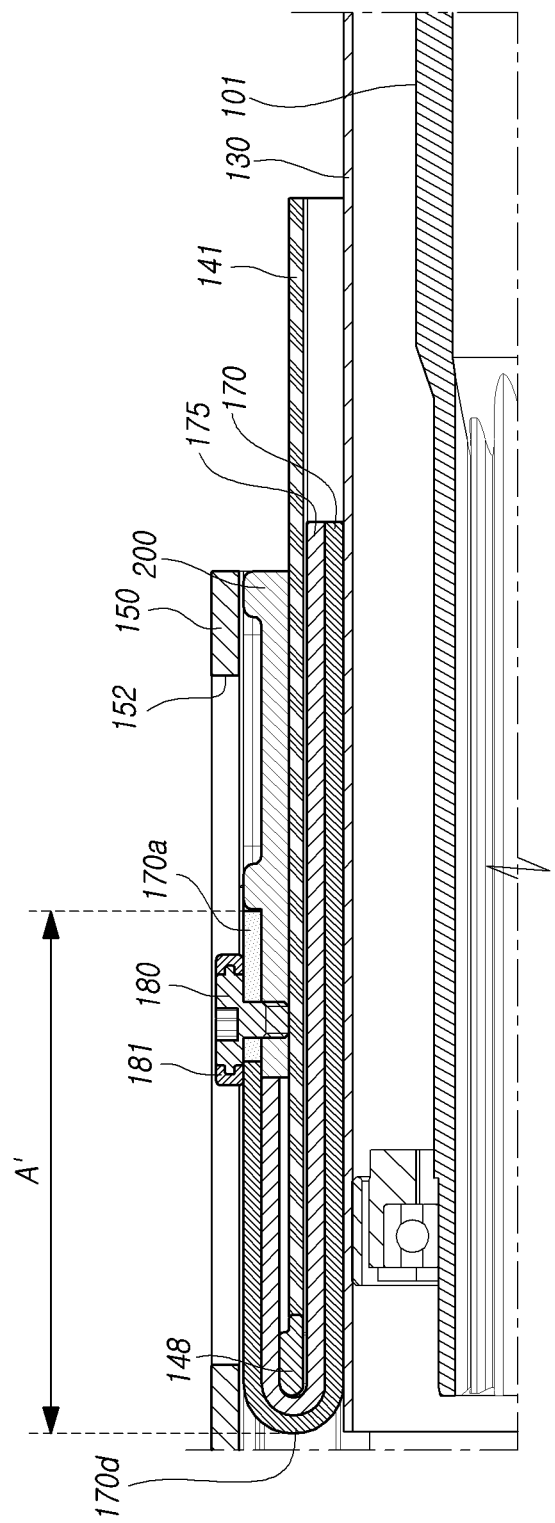
Figure 14:
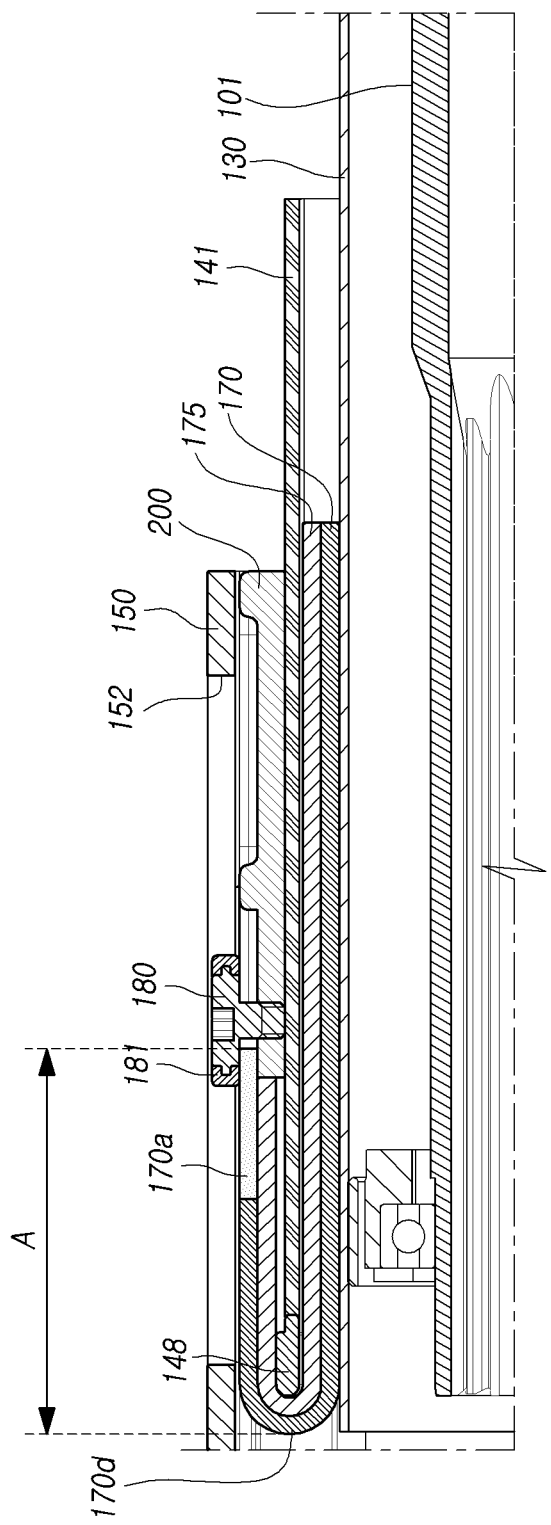

FIG. 1 is a perspective view illustrating a vehicle steering column according to the present embodiments. FIG. 2 is an exploded perspective view of FIG. 1. FIG. 3 is a perspective view illustrating a portion of a vehicle steering column according to the present embodiments. FIG. 4 is an exploded perspective view of FIG. 3. FIG. is a perspective view illustrating a portion of a vehicle steering column according to the present embodiments. FIG. 6 is an exploded perspective view of FIG. 5. FIG. 7 is a perspective view illustrating a portion of a vehicle steering column according to the present embodiments. FIG. 8 is an exploded perspective view of FIG. 7. FIG. 9 is a perspective view illustrating a portion of a vehicle steering column according to the present embodiments. FIGS. 10 and 11 are exploded perspective views illustrating a portion of a vehicle steering column according to the present embodiments. FIGS. 12 to 14 are partial cross-sectional views illustrating a collapse sliding state of a vehicle steering column according to the present embodiments.

As illustrated in the drawings, according to the present embodiments, a vehicle steering column includes an upper column 130 having a distance housing 200 provided on a side of an outer circumferential surface thereof, a telescope fixing member 210 having a plurality of locking recesses 210a axially spaced apart from each other and coupled to aside surface of the distance housing 200, lower column 150 fitted over an outer circumference of the upper column 130, having a slit 151a cut through an outer circumferential surface and inner circumferential surface of an axial side end thereof, having a pair of protruding ends 153 projecting on two opposite sides of the slit 151a while facing each other and penetrated by an adjust bolt 109, a mounting recess 155 formed to be open in a side surface of one of the protruding ends 153, and a telescope moving member 160 having locking protrusions 167a on a lower end to be engaged to the locking recesses 210a and accommodated in the mounting recess 155.

The vehicle steering column according to the present embodiments is a vehicle steering column in which the upper column 130 inserted and coupled to the lower column 150 is axially telescopable and has a structure of absorbing collision energy as the upper column 130 collapses into the lower column 150 when the vehicle collides.

The upper column 130 is provided outside the steering shaft 101 while surrounding the steering shaft 101 which transfers steering force when the driver manipulates the steering wheel and is inserted into the lower column 150 to be slidingly collapsible to the lower column 150 upon vehicle collision.

The lower column 150 having the upper column 130 inserted therein is fixed to the vehicle body by the plate bracket 105, which has tilt slits 105a penetrated by the adjust bolt 109, and the mounting bracket 107, and a steering assist device 115 which assists the steering force of the steering shaft 101 by the motor 111 is provided at a lower end of the lower column 150.

The upper column 130 is formed in a hollow shape and is inserted along the inner circumferential surface of the lower column 150 and, when collapsing, axially slides to the inside of the lower column 150.

The upper column 130 has the distance housing 200 on one side of the outer circumferential surface thereof. The telescope fixing member 210 is provided on one side surface of the distance housing 200. The telescope fixing member 210 has a plurality of locking recesses 210a axially spaced apart from each other.

The lower column 150 coupled to the outer circumference of the upper column 130 has the slit 151a cut through the outer circumferential surface and inner circumferential surface of one axial end thereof and the pair of protruding ends 153 protruding to face each other and penetrated by the adjust bolt 109.

One of the protruding ends 153 of the lower column 150 has a mounting recess 155 formed to be open in an outer surface thereof to accommodate the telescope moving member 160 having locking protrusions 167a at a lower end thereof to be engaged to the locking recess 210a of the telescope fixing member 210.

Accordingly, the locking protrusions 167a of the telescope moving member 160 are disengaged from the locking recesses 210a to allow for axial telescoping and, upon vehicle collision, such a collapsing motion is performed in which the upper column 130 alone is axially moved, with the telescope fixing member 210 fastened to the telescope moving member 160.

An elastic member 161 is provided between an upper end of the telescope moving member 160 and the inner surface of the mounting recess 155 to elastically support the telescope moving member 160 toward the telescope fixing member 210.

Although the elastic member 161 is illustrated as being a coil spring as an example, it is not necessarily limited thereto, but any structure of elastic member which is able to elastically support the telescope moving member 160 is available.

A mounting protrusion 165 is formed on the top of the telescope moving member 160 to prevent escape of the elastic member 161. The mounting protrusion 165 may be inserted into the elastic member 161 and supported.

Further, a communication hole 153a communicating with the mounting recess 155 is formed in the upper end of the protruding end 153 with the mounting recess 155, so that an anti-escape member 162 for preventing escape of the elastic member 161 is coupled thereto and inserted and supported in the elastic member 161.

A lever cam member 157 may be disposed and coupled to a side surface of the telescope moving member 160 to support and vertically move the telescope moving member 160. The lever cam member 157 has a through hole 156 penetrated via a bushing 108 by the adjust bolt 109 to be rotated in conjunction with an adjust lever 103 while its outer circumferential surface 154 is supported in the mounting recess 155 when the adjust lever 104 is rotated.

A supporting protrusion 163 projects from at least one of two opposite side surfaces of the telescope moving member 160, and a supporting arm 158 extends from one side of the lever cam member 157 to support the supporting protrusion 163 of the telescope moving member 160 to support the supporting protrusion 163 to thereby move the telescope moving member 160 when the lever cam member 157 is rotated.

In other words, when telescoping is needed, if the adjust lever 103 is rotated, the fastening force of the plate bracket 105 is reduced by the cam member 110, and thus, the supporting arm 158 of the lever cam member 157, rotated together with the adjust lever 103, supports and moves upwards the supporting protrusion 163 of the telescope moving member 160, thereby allowing the locking protrusions 167a to be released from the locking recesses 210a.

If the telescoping is done, and the adjust lever 103 is rotated in the opposite direction, the telescope moving member 160 is moved downwards by the elastic member 161, and the locking protrusions 167a are engaged to the locking recesses 210a. At this time, even when the locking protrusions 167a are supported between the locking recesses 210a, so-called 'tooth-on-tooth', the elastic member 161 is compressed to allow locking by the adjust lever 103, and the locking protrusions 167a may be guided to the locking recesses 210a by the elastic supporting force of the elastic member 161.

The distance housing 200 has a press-fit indentation 201 in one side surface thereof to allow the telescope moving member 160 to be press-fitted thereinto or may have fixing holes 203a in one side surface thereto to allow fixing protrusions 212, formed on the rear surface of the telescope moving member 160, to be fitted thereinto.

On the outer circumferential surface of the upper column 130 is formed the distance bracket 141 which is axially elongated and inserted into the distance housing 200. Coupling holes 194a and 145 are formed in the other side surfaces of the distance housing 200 and the distance bracket 141, and rupture bolts 194, which are ruptured by a predetermined load or more when a collision occurs, are inserted into the coupling holes 194a and 145.

Accordingly, in normal telescoping, the distance housing 200, the distance bracket 141, and the upper column 130 are fastened together by the rupture bolts 194 and moved inside the lower column 150. However, upon vehicle collision, if a load above the predetermined load is transferred to the steering column, the rupture bolts 194 are ruptured by the load of moving the upper column 130 axially, allowing for axial collapsing of the upper column 130 and the distance bracket 141.

The distance bracket 141 has two opposite ends 143a and 143b bent to leave a space between the outer circumferential surface of the upper column 130 and attached or integrally welded to the outer circumferential surface of the upper column 130.

There is provided a first bending member 175 having one end supported and fixed by an end of the distance housing 200 and the other end bent to surround the lower end of the distance bracket 141 and inserted through the space between the outer circumferential surface of the upper column 130 and the distance bracket 141. If the rupture bolts 194 are ruptured due to collision, the distance bracket 141, collapsing with the upper column 130, plastically deforms the first bending member 175 to absorb the collision energy.

The first bending member 175 has an end formed with a first extension end 175a extending to both sides, and the distance housing 200 has a seating recess 203 formed in the top of an end thereof, so that the first extension end 175a is fitted into the seating recess 203 to fix one end of the first bending member 175.

A fixing protrusion 205 projected from the seating recess 203 of the distance housing 200, and a fixing recess 175h is formed in the first extension end 175a of the first bending member 175 to allow the fixing protrusion 205 to be fitted thereinto, thereby fixing the first bending member 175 free of escape.

Accordingly, if plastic deformation occurs in which the bending portion 175d is stretched out by the distance bracket 141 collapsing along with the upper column 130 when the vehicle collides, the first bending member 175 absorbs the collision energy of the vehicle.

There may further be provided a second bending member 170 having one end supported on an end of the distance housing 200 and the other end bent to surround the first bending member 175 and inserted into the space between the outer circumferential surface of the upper column 130 and the first bending member 175.

The second bending member 170 may optionally double the absorbing capacity of the vehicle collision energy. The second bending member 170 is tightened along with the first bending member 175, with one end thereof supported by the distance housing 200, and is fixed or separated by an actuator 190 to be described below.

In other words, the second bending member 170 has a second extension end 170a extending bilaterally from an end thereof and a bent end 170c bent from the second extension ends 170a to a side of the distance housing 200. An actuator 190 is provided to fix or separate the bent ends 170c to/from the distance housing 200.

To fix or separate the second bending member 170 to/from the distance housing 200, the bent end 170c has a supporting hole 193a that allows insertion and support of an operation pin 193 of the actuator 190, and a fixing hole 192a is formed in a side surface of the distance housing 200 to fix the distance housing 200 with the actuator 190 by a fixing member.

Accordingly, by a signal transmitted from an electronic control unit depending on whether the impact load measured by various sensors attached to the vehicle is above or below a predetermined value, the operation pint 193 of the actuator 190 is inserted into or escaped from the supporting hole 193a, allowing the second bending member 170 to absorb the collision energy.

Branched ends 172 axially extend from the second extension end 170a, separated by an open slit 170b, to prevent the second bending member 170 from absorbing collision energy, i.e., allowing only sliding without plastic deformation. A receiving recess 207 with a fastening hole 180a is formed in an upper end of the distance housing 200, so that a telescope stopper 180 penetrating the slit 170b is inserted into the fastening hole 180a.

Accordingly, if the operation pin 193 of the actuator 190 is released from the supporting hole 193a by a signal transmitted from the electronic control unit when the impact load is above or below a predetermined value so that the distance bracket 141, which is to collapse with the upper column 130 upon vehicle collision, collapses while plastically deforming the first bending member 175, then the branched ends 172 of the second bending member 170 escape from the telescope stopper 180 through the slit 170b, allowing the second bending member to slide without plastic deformation.

Such collision energy absorption process is illustrated in FIGS. 12 to 14. FIGS. 12 and 13 sequentially illustrate an example of absorbing collision energy by the first bending member 175 and the second bending member 170 together, and FIG. 14 illustrates an example of absorbing collision energy by the first bending member 175 alone, with the second bending member 170 only sliding.

Referring to FIGS. 12 and 13 along with FIGS. 5 to 11, in such a case, the operation pint 193 of the actuator 190 is inserted in the supporting hole 193a of the second bending member 170. Thus, upon vehicle collision, a collapse of the upper column is performed, with an end of the second bending member 170 restricted to the distance housing 200.

Accordingly, the bending portions 175*d* and 170*d* of the first bending member 175 and the second bending member 170 are plastically deformed by the distance bracket 141, so that the length A from the bending portion 170*d* of the second bending member 170 up to the one end is increased to A', and the free ends 175*e* and 170*e* of the first bending member 175 and the second bending member 170 are shortened.

Figure 5:
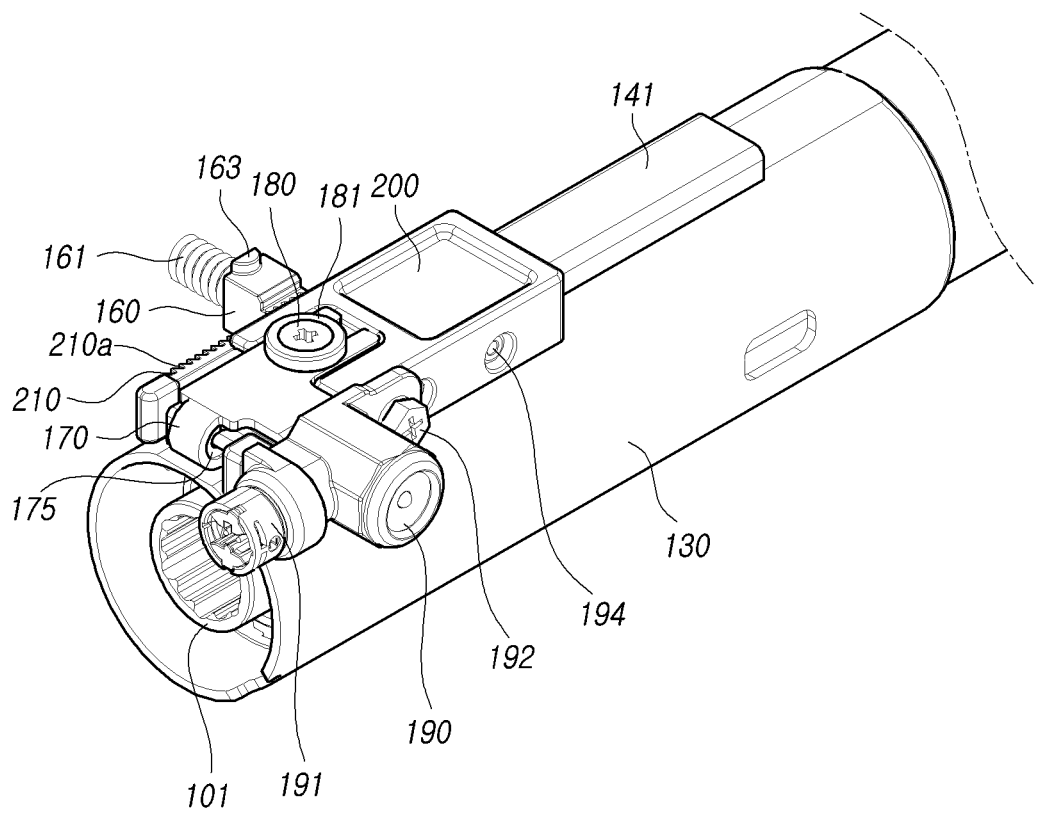
FIG. 5 is a perspective view illustrating a portion of a vehicle steering column according to the present embodiments.

Referring to FIG. 14 along with FIGS. 5 toll, in this case, the operation pin 193 of the actuator 190 is removed from the supporting hole 193*a* of the second bending member 170. Thus, when the vehicle collides, the branched ends 172 of the second bending member 170 are released from the telescope stopper 180 through the slit, so that the second bending member 170 is not plastically deformed but is only slid while the bending portion 175*d* of the first bending member 175, alone, is plastically deformed.

Accordingly, the free end 175*e* of the first bending member 175 is shortened without a change in the length A from the bending portion of the second bending member 170 to the end and the length of the free end 170*e* of the second bending member 170.

Meanwhile, the telescope stopper 180 includes a body press-fitted or screwed to the fastening hole 180*a* provided in the upper end of the distance housing 200 and a head that increases in diameter from the body to be supported by a telescoping hole 152 provided in the lower column 150 when telescoping.

Thus, upon telescoping, when the upper column 130 is slid, the telescope stopper 180 is supported by the telescoping hole 152, restricting the telescoping distance.

The head of the telescope stopper 180 is coupled with a ring-shaped damper 181. Upon normal telescoping, the damper 181 is supported on two opposite sides of the telescoping hole 152 and damped.

Further, the upper column 130 has a flat portion 134 on the outer circumferential surface facing the distance bracket 141 and, when the vehicle collides, the second bending member 170 is tightly supported by the flat portion, creating friction to thereby absorb collision energy.

A contact member 148 is coupled to an end of the distance bracket 141, which abuts the bending portion 175*d* of the first bending member 175, to tightly support and bend the first bending member 175, thereby allowing for smooth contact with the first bending member 175 upon collision. An end of the contact member 148 may be curved to permit a smooth contact.

The contact member 148 may be formed of a plastic resin and may be integrally formed with the distance bracket 141 which is formed of steel or fitted with the distance bracket 141 via a press-fit indentation 147 formed in an end of the distance bracket 141 and a press-fit protrusion 148*a* formed at an end of the contact member 148.

By the present embodiments having the structure and shape as described above, it is possible to allow for smooth collapsing without disturbance between a collapse-sliding component and a fixed component when the vehicle collides.

The present embodiments also provide for easier adjustment of collapsing load of the steering column according to the collision characteristics per vehicle type and thus better collision performance, and a reduction in the number of components and assembly processes and cost savings.

Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

The instant patent application claims priority under 35 U.S.C. 119(a) to Korean Patent Application No. 10-2019-0111844, filed on Sep. 10, 2019, in the Korean Intellectual Property Office, the disclosure of which is herein incorporated by reference in its entirety. The present patent application claims priority to other applications to be filed in other countries, the disclosures of which are also incorporated by reference herein in their entireties.

The invention claimed is:

1. A vehicle steering column, comprising:
    an upper column having a distance housing provided on a side of an outer circumferential surface thereof;
    a telescope fixing member having a plurality of locking recesses axially spaced apart from each other and coupled to a side surface of the distance housing;
    a lower column fitted over an outer circumference of the upper column, having a slit cut through an outer circumferential surface and inner circumferential surface of an axial side end thereof, having a pair of protruding ends projecting on two opposite sides of the slit while facing each other and penetrated by an adjust bolt, a mounting recess formed to be open in a side surface of one of the protruding ends; and a telescope moving member having locking protrusions on a lower end to be engaged to the locking recesses and accommodated in the mounting recess, wherein an elastic member is provided between an upper end of the telescope moving member and an inner surface of the mounting recess to elastically support the telescope moving member toward the telescope fixing member, wherein a lever cam member is coupled in the mounting recess to support and vertically move the telescope moving member and is penetrated by the adjust bolt to be rotated in conjunction with rotation of an adjust lever.

2. The vehicle steering column of claim 1, wherein a communication hole for communication with the mounting recess is formed in an upper end of the protruding end with the mounting recess to allow an anti-escape member for preventing escape of the elastic member to be coupled thereinto.

3. The vehicle steering column of claim 1, wherein a supporting protrusion projects from at least one of two opposite sides of the telescope moving member, and wherein a supporting arm supporting the supporting protrusion extends from a side of the lever cam member.

4. The vehicle steering column of claim 1, wherein a distance bracket is axially elongated on an outer circumferential surface of the upper column and inserted into the distance housing, and wherein coupling holes are formed in other side surfaces of the distance housing and the distance bracket to allow insertion of rupture bolts.

5. The vehicle steering column of claim 4, wherein the distance bracket has two opposite side ends bent to leave a space between them and the outer circumferential surface of the upper column to be coupled to the outer circumferential surface of the upper column.

6. The vehicle steering column of claim 5, further comprising a first bending member having an end supported and fixed by an end of the distance housing and another end bent to surround an end of the distance bracket to be inserted into the space between the outer circumferential surface of the upper column and the distance bracket.

7. The vehicle steering column of claim 6, wherein a first extension end extends to two sides from an end of the first bending member, and wherein a seating recess is formed in an upper end of an end of the distance housing to allow the first extension end to be coupled and fixed thereto.

8. The vehicle steering column of claim 7, wherein a fixing protrusion protrudes on the seating recess of the distance housing, and wherein a fixing recess is formed in the first extension end of the first bending member to allow the fixing protrusion to be fitted thereto.

9. The vehicle steering column of claim 6, further comprising a second bending member having an end supported by an end of the distance housing and another end bent to surround the first bending member to be inserted into a space between the outer circumferential surface of the upper column and the first bending member.

10. The vehicle steering column of claim 9, wherein a second extension end extends to two sides from an end of the second bending member, wherein a bent end is bent from the second extension end to a side surface of the distance housing, and wherein an actuator is provided to fix or separate the bent end to/from the distance housing.

11. The vehicle steering column of claim 10, wherein branched ends axially extend from the second extension end, separated bilaterally by an open slit, wherein a receiving recess with a fastening hole is formed in an upper end of the distance housing, and wherein a telescope stopper penetrating the slit is coupled into the fastening hole.

12. The vehicle steering column of claim 11, wherein a head of the telescope stopper is coupled with a ring-shaped damper.

13. The vehicle steering column of claim 6, wherein the distance bracket is coupled with a contact member to tightly support and bend the first bending member, at an end in contact with a bending portion of the first bending member.

* * * * *